(No Model.)  5 Sheets—Sheet 1.
P. L. SIMPSON.
BRICK MACHINE.
No. 348,064.  Patented Aug. 24, 1886.
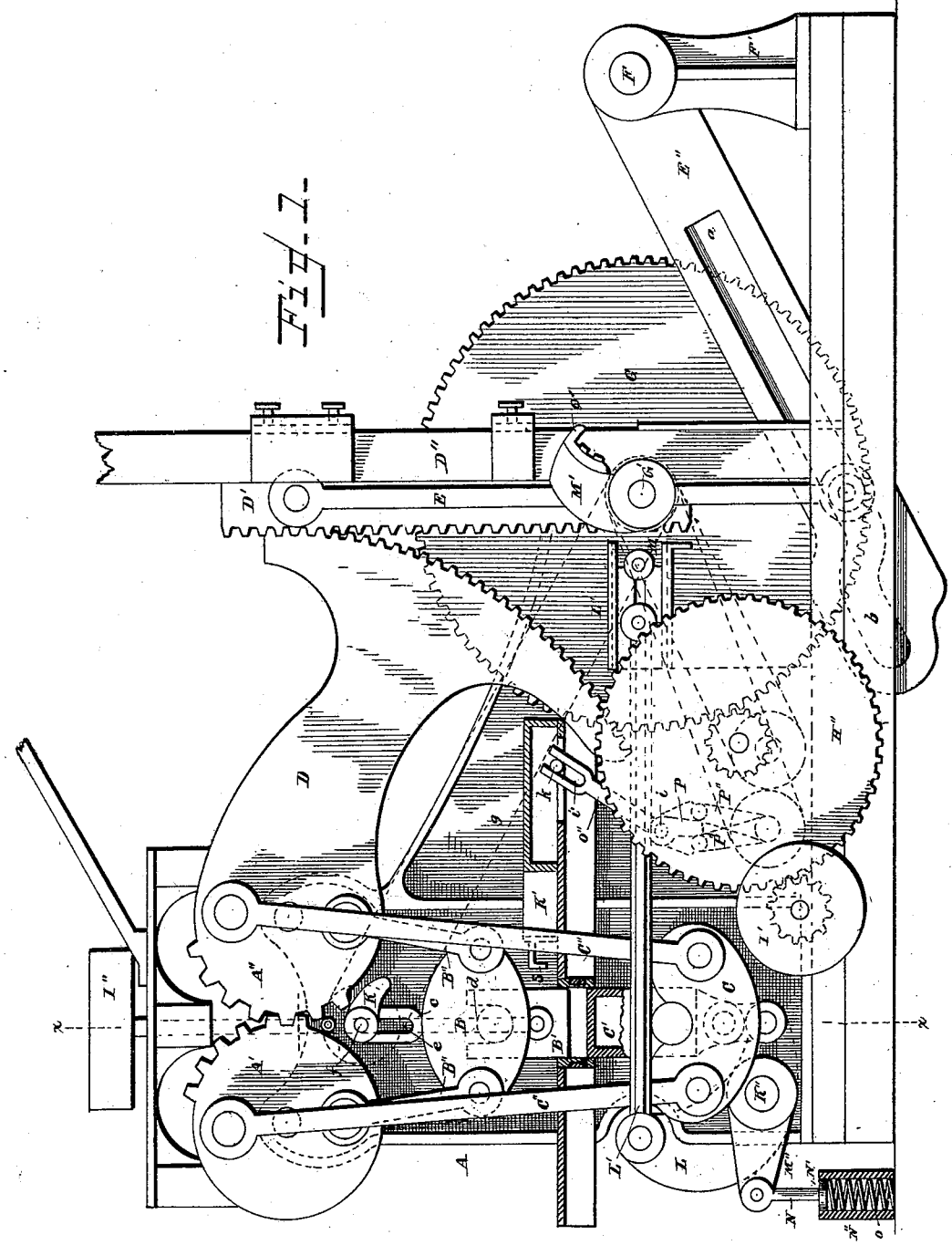
WITNESSES
Edwin L. Yewell,
W. C. Chaffee
INVENTOR
P. L. Simpson
BY
L. W. Ginsabaugh
Attorney
N. PETERS, Photo-Lithographer, Washington, D. C.

(No Model.)  5 Sheets—Sheet 2.
P. L. SIMPSON.
BRICK MACHINE.
No. 348,064.  Patented Aug. 24, 1886.
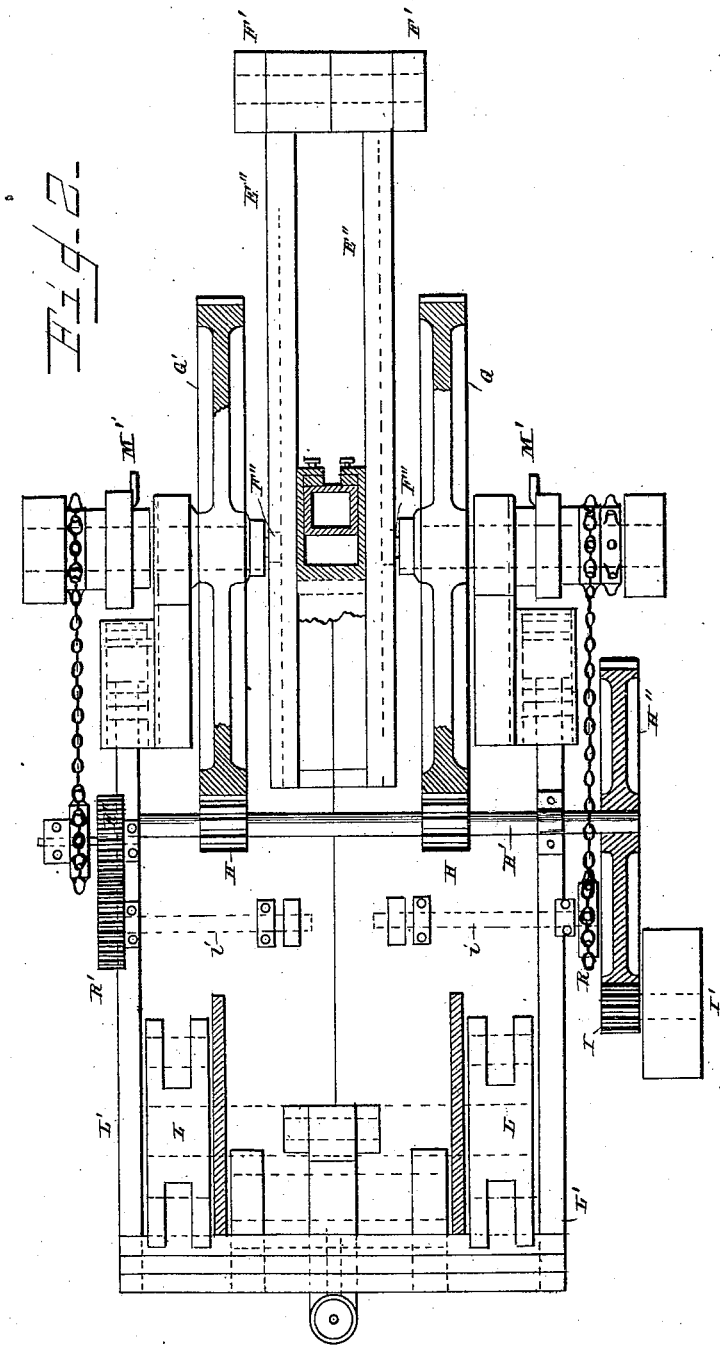

(No Model.)  P. L. SIMPSON.  5 Sheets—Sheet 3.
BRICK MACHINE.
No. 348,064.  Patented Aug. 24, 1886.
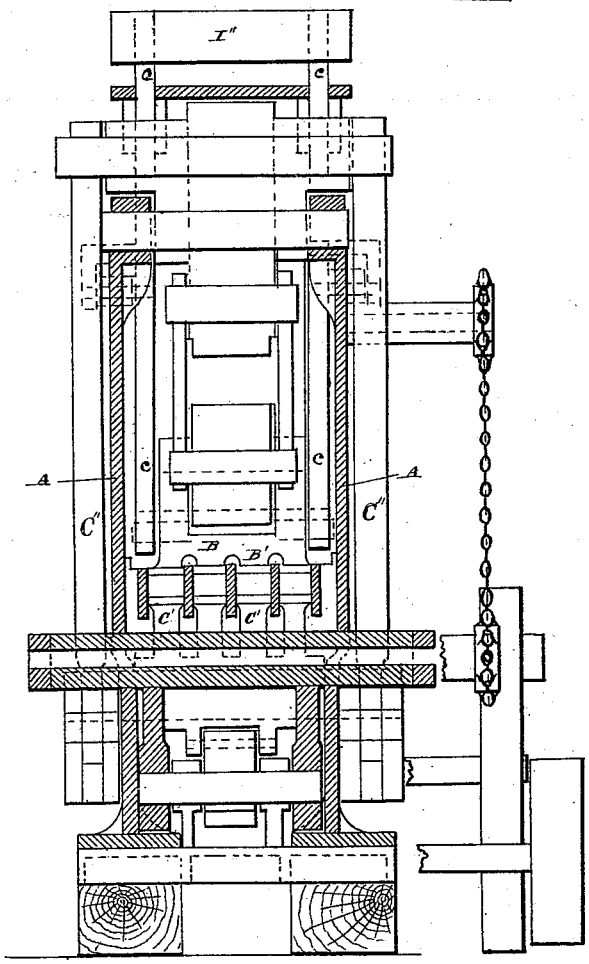
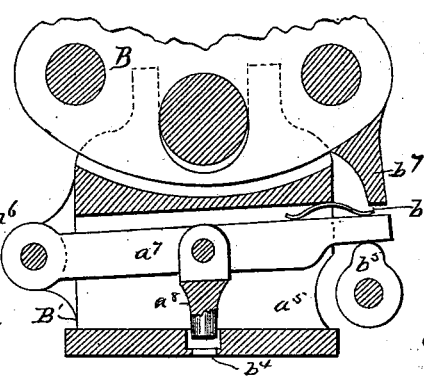

(No Model.) 5 Sheets—Sheet 4.
P. L. SIMPSON.
BRICK MACHINE.
No. 348,064. Patented Aug. 24, 1886.
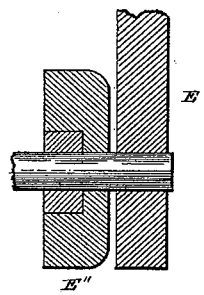
Fig. 5.
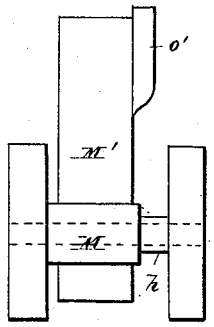
Fig. 6.
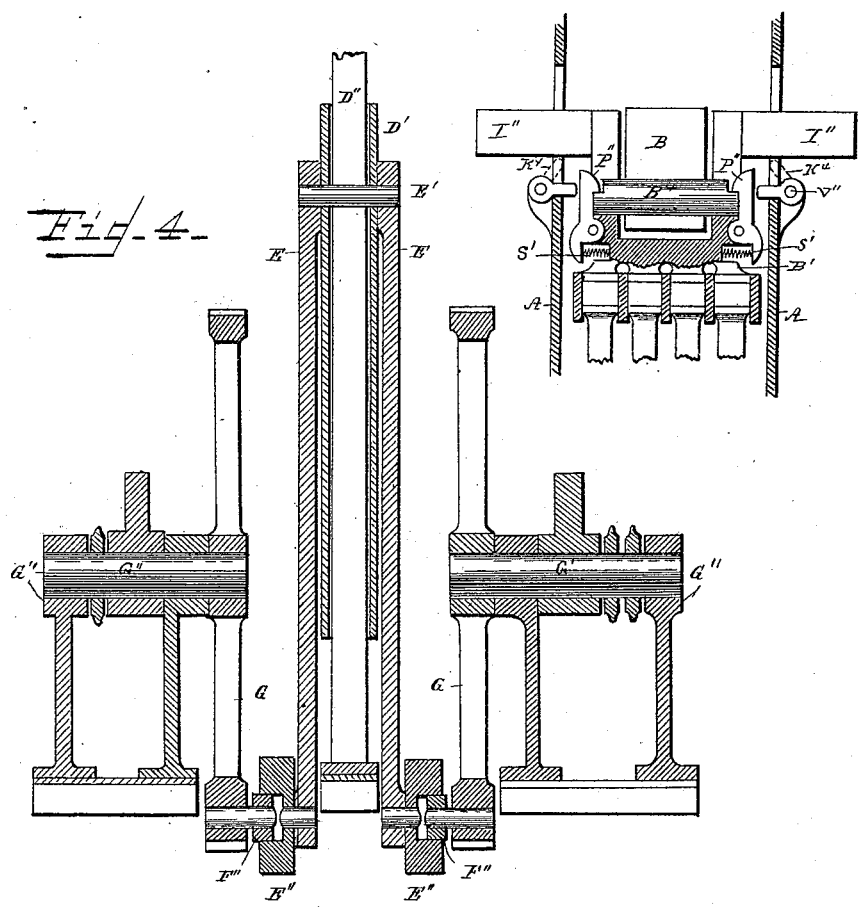
Fig. 4.
Fig. 10.
WITNESSES
Edwin I. Yewell
W. Chaffee
INVENTOR
P. L. Simpson
By
L. W. Ginsabaugh
Attorney

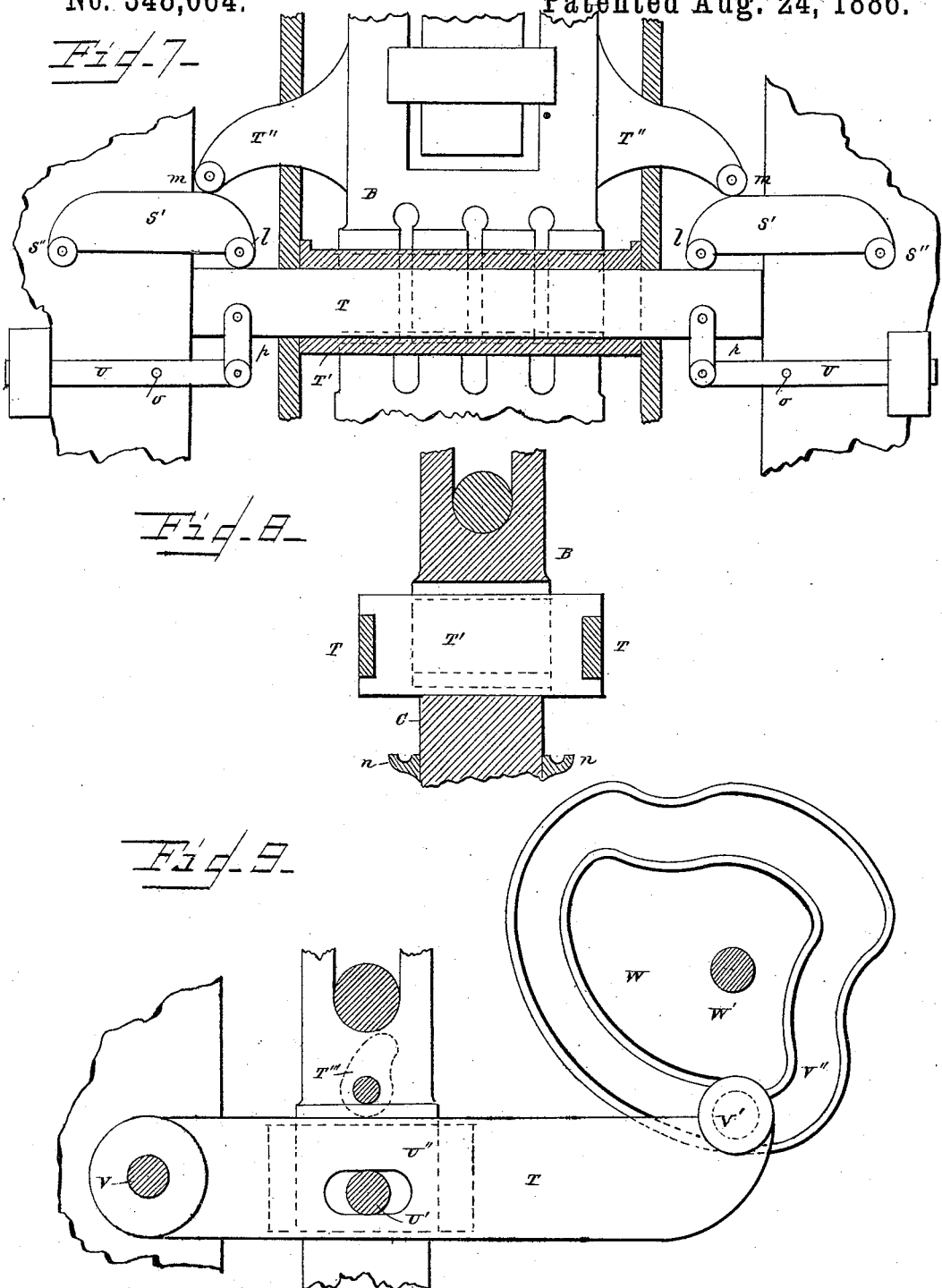

United States Patent Office.

PETER L. SIMPSON, OF MINNEAPOLIS, MINNESOTA.

BRICK-MACHINE.

SPECIFICATION forming part of Letters Patent No. 348,064, dated August 24, 1886.

Application filed December 14, 1885. Serial No. 185,559. (No model.)

*To all whom it may concern:*

Be it known that I, PETER L. SIMPSON, a citizen of the United States, residing at Minneapolis, in the county of Hennepin and State of Minnesota, have invented certain new and useful Improvements in Brick-Machines, of which the following is a specification, reference being had therein to the accompanying drawings.

My invention relates to improvements in brick-machines, and is designed as an improvement on Letters Patent granted to me April 14, 1885, No. 315,849.

In the machine set forth in Letters Patent above referred to the sectors which operate the plungers and the mechanism for operating the other portions of the machine are located below the mold-box, in which the clay is pressed into brick form. In the present instance I place the sectors and other moving portions of the machine above the mold-box, so as to remove them from the dust and grit of the clay as much as possible.

In the drawings, Figure 1 is a vertical longitudinal sectional view of my machine. Fig. 2 is a horizontal longitudinal sectional view of the same. Fig. 3 is a sectional end view on the line $x$ $x$ of Fig. 1. Fig. 4 is a sectional view of the main driving-wheels, pitmen, and levers for operating the sectors. Fig. 5 is a sectional view of a portion of one of the pitmen and one of the slotted levers. Fig. 6 is an end view of the cam and friction-roller for operating the bars which raise the lower plunger to eject the brick from the mold. Fig. 7 is a front view of the plungers and devices for operating the mold-box to raise and lower the same. Fig. 8 is an end view of the mold-box with plunger therein. Fig. 9 is a side view of the mold-box in which alternative devices are used for raising and lowering it. Fig. 10 is a sectional view of a modification for weighting the upper plunger, as will more fully appear hereinafter. Fig. 11 is a longitudinal sectional view of the upper plunger, showing the devices for allowing the air to escape from the clay. Fig. 12 is a vertical transverse view of the devices shown in Fig. 11.

A indicates the sides of the machine, in the upper portion of which are pivoted the sectors A' and A'', as shown, said sectors being provided with spur-gears, which mesh with each other and are operated by mechanism which will be more fully hereinafter described. It is necessary to use two sectors for the reason that if one sector only were used it would produce a side thrust on the frame. If two of the form shown are used, the strain is centralized, and this evil is avoided, while the friction is reduced to a minimum.

B is a cross-head adapted to work in suitable ways in the sides of the machine, and to which the upper plunger, B', is secured. The cross-head B is secured to the lower side of the sectors A' and A'' by means of the links or bars B'', so that when the sectors are turned in one direction the cross-head and upper plunger will be depressed, and by moving the sectors in a reverse direction the plungers and cross-head will be raised.

C is a stirrup which supports the cross-head carrying the lower plungers, C', said stirrup being connected to the upper side of the sectors A' A'' by means of the rods or links C'', the action of the links C'' on the stirrup being to raise and depress the lower plunger when the sectors A' and A'' are operated. One side of the sector A'' is elongated to form a lever-arm, D, the outer end of which is enlarged to form the segment of a circle, and is provided with teeth adapted to engage with the teeth of the rack-bar D'. The rack-bar D' is adapted to work up and down in a groove or way formed in the standard or guide-post D'', said guide-post being firmly secured in the base of the machine.

E E are pitmen, the upper ends of which are secured to the rack-bar D' by means of a pin, the lower ends of said pitmen being secured to the slotted levers E''.

E'' are slotted levers, the rear ends of which are secured to the rock-shaft F, mounted in suitable bearings in standards F'. As before intimated, the levers E'' are provided with a slot, $a$, to receive the friction-wheels F''', which are attached near the peripheries of the spur-wheels G, said wheels being secured to the shafts G', mounted in suitable bearings, G'', on both sides of the machine.

A uniform motion is imparted to the spur-wheels G by means of the pinion-wheels H, secured to the shaft H'. The outer end of the shaft H' is provided with a spur-wheel, H'', which meshes with a pinion-wheel, I, secured to the pulley-shaft I', and by which means motion is imparted to the operating parts just described.

It will be noticed that the movement of the pitmen E to effect the movement of the other parts of the machine is but a slight variation from a straight line. They only describe the arc of a circle, with the rock-shaft F as a center. If the pitmen were attached directly to the spur-wheels G, it is not until they pass the horizontal center of the spur-wheel that the full power is reached on the quarter, a great deal of power being lost by reason of the pull on the pitman being so near the pivotal point of the sectors. In my present improvement, however, this difficulty is entirely overcome, so much so that instead of losing power when the connections of the pitmen to spur driving-wheels are on the quarter-stroke, it increases by the leverage that it has, measuring from the point where the friction-rollers are on the quarter-stroke, and the connections of the pitmen to the slotted levers E''. The slots $a$ in the front end of the levers E'' lie in a different plane from the other portions of the slot, and are shaped, as shown at $b$, in order that the friction-rollers may travel a short distance without moving the pitman downward, thus bringing the plungers to a dead stop and holding the same in contact with the clay within the molds for a short period of time. The slots in the levers E'' may be so shaped as to cause the plungers to make a retrograde or backward movement for a short distance and the pressure resumed again. Any number of distinct pressures can be given to the brick during its formation. In cases of bringing the plungers to a dead stop it is understood of course that the stop only lasts an instant and the pressure is resumed immediately thereafter, and by this arrangement more time is devoted to the pressing of the bricks in the revolution of the main gears, making two-thirds of the time being devoted to pressure, while nearly one-third of the time is devoted to auxiliary movements—such as operating the feed-box, &c.

I'' is a weight supported by the two rods $c\ c$, the lower ends of said rods being attached to the upper plunger, one on each side. The function and operation of the weight is as follows: When the bricks are pressed, the return-movement of the sectors A' A'' lifts the cross-head B upward; but instead of lifting the top plunger, the cross-head travels up a short distance without it, owing to the open connection $d$ of the cross-head with the upper plunger, and the slots $e$ in the rods $c\ c$, thus allowing the top plunger, together with the superincumbent weight, to remain on top of the brick while it is being ejected from the mold, thus preventing the brick from becoming cracked or seamed by the force of suction, as is the case when the upper plunger is removed from the brick while it is yet within the mold. When the brick has been raised a certain distance out of the mold, the cam K operates on the friction-roller secured to the upper portion of the top plunger and raises said plunger and the weight I'' far enough to allow the brick to be pushed over onto the table in the front part of the machine. When the feed-box has moved over and pushed the newly-formed brick from the top of the lower plunger, and has been returned out of the way of the plungers and under the clay-hopper (not shown) for a fresh charge of clay, the cam K has passed over and permits the upper plunger to be forced down by the weight I'' onto the fresh charge of clay within the mold. At this point the sectors are operated to press the clay within the mold in the manner described. The object of this construction is to expel the air in a great measure from the partially-compressed clay, the air making its escape during the time the cross-head B is descending to the plunger, which has already fallen onto the clay.

The cam K is mounted on a shaft, $f$, secured in bearings in the sides of the machine, said shaft being operated by means of a chain, $g$, (shown in dotted lines in Fig. 1,) from the shaft G'. This mechanism may be changed in whatever way it may be necessary to obtain the desired results, which in this case is to disengage the top plunger from the connecting mechanism at the proper moment, so that the weight of the same may fall upon the clay before the sectors begin to exercise their particular function. In practice it may be found desirable to adopt a mechanism as shown at Fig. 10.

B$^4$ is a pivoted shaft carrying cross-head B and upper plunger, B'. This is planed at each end, so that the hook P' may grip the same. This hook P'' is fastened to upper plunger and hinged upon the same. There is also a projecting piece, K$^4$, hinged on the frame A at V'', so that when top plunger descends the lower part of the hook P'', coming in contact with projecting piece K$^4$, disengages the hook from shaft B$^4$, and, owing to the slots in the plunger above the said shaft, the plunger accordingly falls on top of the clay at this moment. The cross-head continuing its descent, and when down low enough, the hook drops into its original position on top of the shaft, owing to the action of the spring S', so that when the cross-head B ascends it carries the plunger up with it. In its ascent, and when the part of the hook shown at P''' comes into contact with projecting piece K$^4$, it swings upward on the pin V''', thus allowing hook to pass upward without disengagement. The weights in this case are on each side of the top plunger and projecting through the frame instead of being on top of the machine.

The mechanism for ejecting the brick from the mold is as follows: K'' is a rock-shaft secured in proper bearings in the sides of the machine, to which are secured the lever arms L, one at each end. The inner ends of the lever-arms L are secured to the lower plungers by means of suitable links, while the outer ends of the lever-arms L are secured to the front ends of the rods L'. The rear ends of the rods L' are adapted to work in guides L" in the sides of the machine, and are provided with friction-wheels M, against which the cams M' on the shaft G' impinge to force the rods L' forward, which forces the outer end of the lever-arm L downward, and raises the inner end of said lever-arm, thus raising the lower plunger to eject the brick from the mold.

M" is an arm or lever secured to the rock-shaft K", to the outer end of which is secured the rod N, said rod being provided with a piston-head, N', adapted to work in the cylinder N", in which is secured the spiral spring O. It will be noticed that when the rods L' are pushed forward the rock-shaft K" is partially turned in its bearings. This movement depresses the lever-arm M" and forces the spring down in the cylinder N", and when the cam M' has passed beyond the friction-roller M the force of the spring will force the parts which operate it back into their normal position and bring the lower plunger down onto the cross-head C, or as far as may be desired, suitable adjusting devices being provided to hold the lower plungers at any desired height in the mold, and thus regulate the holding capacity of the mold and produce brick of any thickness desired, thus permitting the clay from the mold-filler to fall into the mold.

The cam M' is provided with a wrought-iron projection, O', as shown in Fig. 6, and the friction-roller is cut away, as shown at h. The object of this is to quickly remove the cam from contact with the friction-wheel and allow the lower plunger to drop suddenly. If the friction-roller were kept the full diameter, it is evident that the plunger would not drop so quickly, as the cam would have to pass beyond the full radius of friction-roller before the spring O would have its full effect. The small diameter of a portion of the friction-roller, however, allows the extension of the cam to suddenly leave said roller, and permits the lower plungers to drop.

K' is the mold-filler, adapted to slide in suitable ways under the clay-hopper. (Hoppers not shown.)

O" is an arm or lever secured to the shaft, pivoted in the machine at any suitable point, the upper end of said lever being connected to the mold-filler by means of the slotted end $i'$ and pin $k$. The shaft $i$ is provided with two projections, P, one at each side of the machine. (Only one shown.) The projections P are operated upon by two crank arms or levers, P' P". One of these arms or levers is worked on one side of the machine by a chain-wheel, R, direct from the main shaft G'. The other side is driven in the same way, but the direction of the motion is changed by the spur-gears R' R", and by this means one of the crank arms or levers P' or P" is driven one way, to push the feed-box over the mold-cavity, while the other crank-arm is driven in the reverse direction to force the feed-box back under the clay-hopper. The feed-box is provided with an extension, S, at its front end, where it comes in contact with the newly-formed brick, and is of the form shown in Fig. 1, so that the loose clay which lies in front of the filler will not be pressed against the end or side of the brick, but will find its way into the mold. A piece of rubber may be fastened to the front end of the feed-box, to clean the face of the lower plunger as it travels back and forth over it.

It is important in the manufacture of fine brick that the mold-box should be slightly moved in a vertical direction while the plungers are acting on the clay to compress the same into brick form. This movement of the mold-box prevents the clay from adhering to the same, and forms thereon a slick skin or glaze which adds to the commercial value of the brick. The movement of the mold-box may be effective in several ways, as shown in Figs. 7, 8, and 9.

S' S' are two short levers hinged to the frame of the machine at S", (frame of machine not shown,) the front end of said levers being provided with friction-wheels $l$, which impinge on the bars T, which fit in recesses in the sides of the mold T' and support the same in its proper position in the frame of the machine.

T" are projections or lugs secured to the upper plunger or to the cross-head, said projections being provided with friction-wheels $m$, which impinge on the pivoted levers S' and force them together with the bars T and mold-box T' slightly downward, as the upper plunger descends to compress the clay. The brick is partially pressed before this downward movement of the mold-box takes place, but when the mold-box begins to descend it travels faster than the top plunger, owing to the part S' being hinged, the free end of the bar S' traveling faster than the projection $m$ on the upper plunger. By reversing this mechanism the stirrup or cross-head of lower plunger may be made to accomplish this movement, and this I consider to come within the scope of my invention. The lower plunger, C, is provided with projections N, which impinge on the under side of the mold and lift the same flush with the top of the table of the machine by the same movement that ejects the brick from the mold.

U are weighted levers pivoted to the side of the machine at O, the inner ends of which are secured to the bars T by the links $p$. The function of the weighted levers U is to hold the mold-box on a level with the top of the table when the lower plunger drops until the mold is filled with clay and forced down by the action of the upper plunger, as already indicated.

The mold-box may be moved to accomplish the same results in the following manner, reference being made to Fig. 9: The bars T, one on each side, are secured to the mold-box T' by means of pins U', which move in slots U" in said bars. The bars T are pivoted at one end to the side of the machine, as shown at V, while the other ends of said bars are provided with friction-rollers V', which engage with a cam-groove, V'', in the cam-wheel W, said cam-wheel being mounted on a suitable shaft, W', and positively driven by any suitable means. The cam in the wheel or disk W is so shaped as to give the necessary movement to the mold-box.

In Figs. 11 and 12 I have shown devices by which the air is allowed to escape from the clay, and thus form a solid and compact brick. Each plunger B' is cast hollow or with an aperture, $a^5$, through it, one side of the plunger being provided with lugs $a^6$, to which the bar $a^7$ is pivoted, said bar $a^7$ extending lengthwise through the aperture $a^5$. $a^8$ is a pin secured to the bar $a^7$ at or near its center, said pin being adapted to fit into a recess or opening, $b^4$, formed through the pressing-face of the plunger. The recess or opening $b^4$ is made larger at its upper end, so that when the pin $a^8$ is raised by the cam $b^5$ impinging on the end of the bar $a^7$ the air will be free to pass out through the opening in the plunger. Instead of the pin $a^8$, I may form a slot in the face of the mold, in which is placed edgewise a thin metallic plate adapted to be raised and lowered, as already indicated. The action of this portion of the machine is as follows: As soon as the feed-box has deposited the proper charge of clay in the mold and is out of the way of the descending top plunger the latter falls forcibly on top of the clay within the mold. When this happens, the bottom of the pin $a^8$ is either flush with the face of the plunger or slightly below it, as may be preferred. In order to keep the bar or lever $a^7$ from jumping up by the shock of the falling plunger the spring $b^6$ is made to press down with force enough to overcome this tendency. As soon as the plunger has fallen the cam $b^5$ is operated from any suitable point or by any suitable means to raise the end of the bar or lever $a^7$, said bar or lever being raised high enough to bring the pin $a^8$ well up into the wide portion of the opening $b^4$, thus allowing any air which has been confined in the clay to escape. The cam $b^5$ remains in this position, keeping the valve open until the projection $b^7$, which is a part of the cross-head, comes nearly in contact with the end of the bar or lever $a^7$ when the cam is rolled back, and the projection $b^7$ coming in contact with the end of the bar or lever $a^7$ it is pressed down until the pin $a^8$ is down flush with the face of the plunger. As before stated, a thin plate may be used instead of the pin $a^8$, or a series of these pins may be employed to fit into corresponding cavities in the face of the plunger. As a further means of permitting the air to escape from the mold and from the clay within the mold before the final pressure is given, I employ a cam, T''', shown in dotted lines in Fig. 9, to raise the upper plunger slightly after it has fallen onto the clay within the molds and before the cross-head comes down to make the final pressure. This cam is pivoted in any convenient position, so as to impinge upon and raise the upper plunger at the time stated, said cam being positively driven by any suitable means.

Having thus described my invention, what I claim, and desire to secure by Letters Patent, is—

1. In a brick or other machine for compressing substances into form, sectors A' A'', pivoted in the sides of the machine and connected to the plungers, as described, said sectors being adapted to mesh with each other, the sector A'' being provided with a lever-arm, D, which is raised and lowered to operate the plungers, as set forth.

2. In a brick-machine, the sectors A' A'', pivoted in the sides of the machine, and adapted to mesh with each other to operate the plungers, as described, the sector A'' being provided with an extension having a segmental rack on its outer end, adapted to engage with a vertically-moving rack-bar, as set forth.

3. In a brick or other machine for pressing substances into form, the spur-wheels G, mounted in bearings on each side of the standard D'', and provided with friction-wheels adapted to work in slots in the levers E'', said levers being connected to the rack-bar D' by means of rods E, whereby a vertical or nearly vertical movement is imparted to the rack-bar, as set forth.

4. In a brick or other machine for pressing substances into form, the levers E'', having the slots $a$ of irregular form, as described, in combination with the spur-wheels G, rods E, rack-bar D', and sectors A' A'', whereby a period of rest is given the plungers during the pressing operation, as set forth.

5. In a brick-machine, the plungers B', having a movement separate and distinct from the cross-head B, said plungers being provided with weights for causing them to drop onto the clay in the molds prior to the pressing operation, as set forth.

6. In a brick or other machine for compressing substances into form, the upper plungers of which are slotted and provided with a weight, I, whereby said plungers are suddenly dropped onto the clay in the mold and held in contact with the brick until said plungers are raised to the top of the mold during the process of ejecting the brick from the mold, as set forth.

7. In a brick-machine, the cams M', constructed as described, in combination with the rods L', levers L, and plungers C', with their intermediate connections, whereby the lower plungers are raised to eject the brick from the mold, as set forth.

8. In a brick-machine, the rock-shaft K'', provided with the spring-actuated arm M'', in combination with the levers L and rods L', whereby the lower plunger is returned to its proper place after the brick has been ejected from the mold, as set forth.

9. In a brick-machine, the plungers B, provided with projections T'', in combination with the levers S', bars T, secured to the mold T', and the weighted levers N, as and for the purpose set forth.

10. In a brick-machine, the lower plungers, C, provided with the projections $n$, in combination with the movable mold T', whereby said mold is slightly raised during the process of ejecting the brick from the mold, as set forth.

11. In a brick-machine, the rods L', provided with friction-wheels having one portion of smaller diameter than the other portion, in combination with the cams M', having the projections O' to impinge on the smaller portion of the friction-wheel, whereby the cam is suddenly released from contact with the friction-roller, as set forth.

12. In a brick-machine, the mold-filler K', provided with the overhanging projection S, whereby the brick is pushed off of the plunger without bringing the loose clay in contact therewith, as set forth.

13. In a brick-machine, the mold-filler K, operated in one direction by a continuously-rotating shaft, and in the other direction by a similar shaft driven in a reverse direction, as set forth.

14. In a brick-machine the plungers of which are hollow and provided with an aperture or apertures in the pressing-face, adapted to be opened or closed by filling-pieces to permit the air to escape, said filling-pieces being arranged to lie flush with the face of the plunger during the pressing operation, as set forth.

15. In a brick-machine, the hollow plungers B', having an aperture or apertures in their faces, as described, in combination with the pivoted bar $a^7$, having the plug or bar $a^8$ to fill the apertures of the face of the plungers, and the cam $b^5$, for raising the plugs to allow the air to escape from the mold, as set forth.

16. In a brick-machine, the hollow plungers B', provided with the bar or lever $a^7$, carrying the plug $a^8$, and spring $b^6$, in combination with the cross-head B, having the projection $b^7$, adapted to press on the outer end of the lever $a^7$, to close the openings in the face of the plunger during the pressing operation, as set forth.

17. In a brick-machine, the upper plungers, B', loosely connected to the cross-head B, said plungers being adapted to be slightly raised before the final pressure is exerted, whereby the air is permitted to escape from the clay within the mold, as set forth.

18. In a brick-machine, the upper plungers, B', loosely connected to the cross-head B, as described, in combination with the cam T''', as set forth.

In testimony whereof I affix my signature in presence of two witnesses.

PETER L. SIMPSON.

Witnesses:
FRANKLIN COOK,
WAYLAND B. AUGIR.